United States Patent
Okafuji et al.

(10) Patent No.: US 10,100,171 B2
(45) Date of Patent: Oct. 16, 2018

(54) RESIN COMPOSITION, RESIN SHEET, AND RESIN LAMINATE

(71) Applicant: Mitsubishi Chemical Corporation, Tokyo (JP)

(72) Inventors: Hiroshi Okafuji, Otake (JP); Osamu Kawai, Otake (JP); Hideto Yamazawa, Otake (JP); Masahiko Ono, Otake (JP)

(73) Assignee: Mitsubishi Chemical Corporation, Tokyo (JP)

( * ) Notice: Subject to any disclaimer, the term of this patent is extended or adjusted under 35 U.S.C. 154(b) by 178 days.

(21) Appl. No.: 15/104,314

(22) PCT Filed: Dec. 11, 2014

(86) PCT No.: PCT/JP2014/082818
§ 371 (c)(1),
(2) Date: Jun. 14, 2016

(87) PCT Pub. No.: WO2015/093384
PCT Pub. Date: Jun. 25, 2015

(65) Prior Publication Data
US 2016/0347930 A1 Dec. 1, 2016

(30) Foreign Application Priority Data

Dec. 16, 2013 (JP) .................. 2013-259007
Feb. 18, 2014 (JP) .................. 2014-028280
Mar. 18, 2014 (JP) .................. 2014-054776

(51) Int. Cl.

| | | |
|---|---|---|
| *B32B 7/02* | (2006.01) | |
| *C08K 5/109* | (2006.01) | |
| *B32B 27/30* | (2006.01) | |
| *B32B 27/32* | (2006.01) | |
| *B32B 27/36* | (2006.01) | |
| *C08L 101/12* | (2006.01) | |
| *B32B 27/08* | (2006.01) | |
| *C08J 5/18* | (2006.01) | |
| *C08L 33/12* | (2006.01) | |
| *G06F 3/044* | (2006.01) | |
| *C08L 33/10* | (2006.01) | |
| *G06F 3/041* | (2006.01) | |

(52) U.S. Cl.
CPC ............. *C08K 5/109* (2013.01); *B32B 7/02* (2013.01); *B32B 27/08* (2013.01); *B32B 27/30* (2013.01); *B32B 27/302* (2013.01); *B32B 27/308* (2013.01); *B32B 27/32* (2013.01); *B32B 27/365* (2013.01); *C08J 5/18* (2013.01); *C08L 33/12* (2013.01); *C08L 101/12* (2013.01); *G06F 3/044* (2013.01); *B32B 2307/21* (2013.01); *B32B 2307/408* (2013.01); *B32B 2307/412* (2013.01); *B32B 2307/558* (2013.01); *B32B 2307/7145* (2013.01); *B32B 2457/202* (2013.01); *B32B 2457/208* (2013.01); *C08J 2333/12* (2013.01); *C08L 33/10* (2013.01); *C08L 2201/10* (2013.01); *C08L 2203/16* (2013.01); *C08L 2203/20* (2013.01); *G06F 3/041* (2013.01)

(58) Field of Classification Search
CPC .......... B32B 2307/21; B32B 2307/408; B32B 2307/412; B32B 2307/558; B32B 2307/7145; B32B 2457/202; B32B 2457/208; B32B 27/08; B32B 27/30; B32B 27/302; B32B 27/308; B32B 27/32; B32B 27/365; C08J 2333/12; C08J 5/18; C08K 5/109; C08L 101/12; C08L 2201/10; C08L 2203/16; C08L 2203/20; C08L 33/10; C08L 33/12; G06F 3/041; G06F 3/044
See application file for complete search history.

(56) References Cited

U.S. PATENT DOCUMENTS

| | | | |
|---|---|---|---|
| 5,194,490 A | 3/1993 | Suga et al. | |
| 2005/0260501 A1 | 11/2005 | Okumura et al. | |

FOREIGN PATENT DOCUMENTS

| | | |
|---|---|---|
| EP | 2 465 907 A1 | 6/2012 |
| JP | 57-143356 A | 9/1982 |
| JP | 2-298504 A | 12/1990 |
| JP | 3-156803 A | 7/1991 |
| JP | 4-211412 A | 8/1992 |
| JP | 2001-123040 A | 5/2001 |
| JP | 2004-362976 A | 12/2004 |
| JP | 2005-332699 A | 12/2005 |
| JP | 2005-343937 A | 12/2005 |
| JP | 2005-343938 A | 12/2005 |
| JP | 2010-180070 A | 8/2010 |

OTHER PUBLICATIONS

Extended European Search Report dated Oct. 10, 2016 in Patent Application No. 14872210.1.
International Search Report dated Mar. 3, 2015 in PCT/JP2014/082818 Filed Dec. 11, 2014.

*Primary Examiner* — Amber R Orlando
*Assistant Examiner* — Lawrence D Ferguson
(74) *Attorney, Agent, or Firm* — Oblon, McClelland, Maier & Neustadt, L.L.P.

(57) ABSTRACT

A resin composition comprising 100 parts by mass of a polymer (A) and 0.5 parts to 60 parts by mass of a high dielectric material (B), the high dielectric material (B) having a relative dielectric constant at 20° C. of 10 or more, a melting point of 45° C. or lower, and a boiling point of 150° C. or higher.

13 Claims, No Drawings

RESIN COMPOSITION, RESIN SHEET, AND RESIN LAMINATE

TECHNICAL FIELD

The present invention relates to a resin composition, a resin sheet, and a resin laminate.

The present application claims priority based on Japanese Patent Application No. 2013-259007 filed in Japan on Dec. 16, 2013; Japanese Patent Application No. 2014-028280 filed in Japan on Feb. 18, 2014; and Japanese Patent Application No. 2014-054776 filed in Japan on Mar. 18, 2014, the disclosures of which are incorporated herein by reference.

BACKGROUND ART

In various display devices including liquid crystal displays, transparent protective sheets are used on the surfaces of the devices. Regarding these transparent sheets, glass sheets have been used; however, plastic sheets have also come to be used for the purpose of enhancement of machinability, enhancement of safety, improvement of lightweightness, and the like.

In mobile telephones that have been hitherto developed, display screens are intended for displaying characters or images, and operation of the display screens involves pressing of a key button that is separately provided. In recent years, touch panels for operation are increasingly employed in many of various display devices including mobile telephones. In these display devices, signals can be input by directly touching the display screen. Regarding these touch panels for screen operation, resistive film type touch panels have been used in many cases; however, the use of electrostatic capacitance type touch panels is recently increasing, because these touch panels have diverse operability.

An electrostatic capacitance type touch panel is a touch panel of a system by which minute electrical changes caused by finger movement, that is, changes in the electrostatic capacitance, are captured, and thereby positions are detected. Since an electrostatic capacitance type touch panel is capable of detecting the movement of a finger only by having the finger come close to the touch panel without directly touching the sensor, a cover formed from a glass sheet can be attached to the surface of the touch panel. Therefore, it has become possible to provide a display device which has excellent designability, high resistance to scratches, and excellent durability and resistance to environment.

Regarding the transparent sheet that constitutes a display, a glass sheet, particularly a reinforced glass sheet is used in many occasions. However, there is a problem that it is difficult to process a glass sheet by cutting, preventive measures against scattering are also required when the glass sheet has broken, and the cost is expensive.

Accordingly, transparent plastic sheets such as a methacrylic resin sheet or a polycarbonate resin sheet, which are lightweight and have excellent processability compared to glass, are now used for various transparent sheets for display. Under such circumstances, in regard to a sheet for display used in a touch panel system, particularly in an electrostatic capacitance type touch panel, there has been a demand to increase the relative dielectric constant of the transparent plastic sheet in order to increase the response speed when a finger or the like touches the plastic sheet.

As a technique for increasing the relative dielectric constant, a technique of adding inorganic fine particles to a resin is known (Patent Document 1).

CITATION LIST

Patent Document

Patent Document 1: JP 2010180070 A

SUMMARY OF THE INVENTION

Problem to be Solved by the Invention

However, when it is attempted to obtain a plastic material having a high relative dielectric constant, there is a problem that transparency of the plastic material is decreased. Thus, a plastic material which satisfies both high transparency and a high relative dielectric constant has not yet been obtained.

A first object of the present invention is to provide a resin sheet having satisfactory transparency and having a high relative dielectric constant, and a resin laminate having satisfactory transparency and a surface with a high relative dielectric constant.

Furthermore, a second object of the present invention is to provide a resin sheet having satisfactory transparency, excellent impact resistance and a high relative dielectric constant, and a resin laminate having satisfactory transparency, excellent impact resistance and a surface with a high dielectric constant.

Means for Solving Problem

The objects described above are solved by the following inventions [1] to [15].

[1] A resin composition including 100 parts by mass of a polymer (A) and 0.5 to 60 parts by mass of a high dielectric material (B), the high dielectric material (B) having a relative dielectric constant at 20° C. of 10 or more, a melting point of 45° C. or lower, and a boiling point of 150° C. or higher.

[2] The resin composition according to including the high dielectric material (B) in an amount of 7.5 parts to 15 parts by mass.

[3] The resin composition according to [1] including the high dielectric material (B) in an amount of 10 parts to 13 parts by mass.

[4] The resin composition according to any one of [1] to [3], in which the relative dielectric constant at 20° C. of the high dielectric material (B) is 50 or more.

[5] The resin composition according to any one of [1] to [4], in which the high dielectric material (B) is at least one compound selected from the group consisting of ethylene carbonate and propylene carbonate.

[6] The resin composition according to any one of [1] to [5], in which the polymer (A) is at least one polymer selected from an acrylic polymer, an aromatic vinyl monomer unit-containing polymer, an olefin resin, and a polycarbonate resin.

[7] The resin composition according to any one of [1] to [6], in which the polymer (A) is at least one polymer selected from polymethyl methacrylate, and an acrylic copolymer (A-1) containing 40% by mass or more and less than 100% by mass of a methyl methacrylate unit; and more than 0% by mass and 60% by mass or less of another vinyl monomer unit.

[8] The resin composition according to [7], in which the other vinyl monomer unit is a monomer unit derived from a monomer having two or more ethylenically unsaturated bonds in the molecule.

[9] The resin composition according to [8], in which the other vinyl monomer is a monomer unit derived from neopentyl glycol dimethacrylate.

[10] A resin sheet containing the resin composition according to any one of [1] to [9].

[11] A resin laminate having a functional layer laminated on one surface or on both surfaces of the resin sheet according to [10].

[12] The resin laminate according to [11], in which the functional layer is a layer having at least one function selected from an antireflection function, an antiglare function, a hard coat function, an antistatic function, and an antifouling function.

[13] A resin sheet having a relative dielectric constant at 20° C. of 4.0 or more, a transmittance of 80% or more, and a haze value of 2% or less.

[14] The resin sheet according to [13], having a transmittance of 88% or higher and a haze value of 1% or lower.

[15] The resin sheet according to [13] or [14], having a deflection temperature under load of 80° C. or higher.

Effect of the Invention

According to the present invention, a resin laminate which has excellent transparency and a high relative dielectric constant is obtained, and the resin laminate is therefore suitable when a person uses the resin laminate by direct touching. And a resin laminate which has excellent transparency, excellent impact resistance and a high relative dielectric constant is obtained, and the resin laminate is therefore suitable when a person uses the resin laminate by direct touching.

MODE(S) FOR CARRYING OUT THE INVENTION

Hereinafter, the present invention will be described.
<Polymer (A)>

Examples of the polymer (A) include an acrylic polymer, polystyrene, an aromatic vinyl monomer unit-containing resins such as a styrene-methyl methacrylate copolymer; an olefin resins such as a cyclic polyolefin; a polycarbonate resins such as a polycarbonate; and multilayer materials of polycarbonate and materials of different kinds.

Among these, an acrylic polymer, an aromatic vinyl monomer unit-containing polymer, an olefin resin, and a polycarbonate resin are preferable as for the polymer (A). Furthermore, from the viewpoint of having satisfactory transparency, an acrylic polymer is preferable as for the polymer (A).

As an example of the acrylic polymer used as the polymer (A), polymethyl methacrylate is mentioned. Furthermore, as another example of the acrylic polymer used as the polymer (A), a copolymer containing an alkyl methacrylate unit as a main constituent component is mentioned. For example, a copolymer containing an alkyl methacrylate unit at a proportion of 70% or more and less than 100% by mass relative to the total mass of the copolymer may be mentioned.

An example of the copolymer containing an alkyl methacrylate unit as a main constituent component is an acrylic copolymer (A-1) containing 40% by mass or more and less than 100% by mass of a methyl methacrylate unit; and more than 0% by mass to 60% by mass or less of another vinyl monomer unit, relative to the total mass of the acrylic copolymer (A-1).

Furthermore, the proportion of the other vinyl monomer unit of the acrylic copolymer (A-1) relative to the total mass of the acrylic copolymer is preferably from 1% to 20% by mass, and more preferably from 3% to 10% by mass.

Meanwhile, it is noted that the sum of the percentage by mass of the various compounds does not exceed 100% by mass.

Examples of other vinyl monomer that constitutes the other vinyl monomer unit include the following compounds.

(Meth)acrylic acid esters such as methyl acrylate, ethyl (meth)acrylate, isopropyl (meth)acrylate, t-butyl (meth)acrylate, i-butyl (meth)acrylate, n-butyl (meth)acrylate, cyclohexyl (meth)acrylate, bornyl (meth)acrylate, norbornyl (meth)acrylate, isobornyl (meth)acrylate, adamantyl (meth)acrylate, dimethyladamantyl (meth)acrylate, methylcyclohexyl (meth)acrylate, norbornylmethyl (meth)acrylate, menthyl (meth)acrylate, phenethyl (meth)acrylate, dicyclopentanyl (meth)acrylate, dicyclopentenyl (meth)acrylate, dicyclopentenyloxyethyl (meth)acrylate, cyclodecyl (meth)acrylate, 4-t-butylcyclohexyl (meth)acrylate, and trimethylcyclohexyl (meth)acrylate; (2-oxo-1,3-dioxolan-4-yl) (meth)acrylate, γ-butyrolactone (meth)acrylate, and (2-methyl-2-ethyl-1,3-dioxolan-4-yl) (meth)acrylate.

Alkanediol di(meth)acrylates such as ethylene glycol di(meth)acrylate, 1,2-propylene glycol di(meth)acrylate, 1,3-butylene glycol di(meth)acrylate, 1,6-hexanediol di(meth)acrylate, and neopentyl glycol di(meth)acrylate; polyoxyalkylene glycol di(meth)acrylates such as diethylene glycol di(meth)acrylate, dipropylene glycol di(meth)acrylate, methylene glycol di(meth)acrylate, tetraethylene glycol di(meth)acrylate, and polyethylene glycol di(meth)acrylate; polyfunctional polymerizable compounds having two or more ethylenically unsaturated bonds in the molecule, such as divinylbenzene; and an unsaturated polyester prepolymer derived from at least one polyvalent carboxylic acid including an ethylenically unsaturated polycarboxylic acid, and at least one diol.

A "polyvalent carboxylic acid" means a carboxylic acid having two or more carboxyl groups in the molecule.

According to the present invention, a "(meth)acrylate" means at least one selected from "acrylate" and "methacrylate", "(meth)acryl" means at least one selected from "acryl" and "methacryl", and "(meth)acryloyloxy" means at least one selected from "acryloyloxy" and "methacryloyloxy".

The other vinyl monomers can be used singly or in combination of two or more kinds hereof.

For the acrylic copolymer (A-1), at least one can be selected from among copolymers formed by combining the methyl methacrylate unit and the other vinyl monomer unit at the proportion ranges described above.

From the viewpoint of increasing the deflection temperature under load of the polymer (A), a monomer having two or more ethylenically unsaturated bonds in the molecule is preferable as for the other vinyl monomer, and neopentyl glycol dimethacrylate is more preferable as for the other vinyl monomer.

According to the present invention, the deflection temperature under load is a value measured according to ISO 75-2:2004, and represents the temperature at which the temperature of a sample is gradually raised in a state of being under a load determined by ISO 75-2: 2004, and the magnitude of the deflection reaches a certain value.

Examples of the form of the polymer (A) include a powder and a pellet.

Examples of the method for producing an acrylic polymer that is used as the polymer (A) include a bulk polymerization method, a solution polymerization method, an emulsion polymerization method, and a suspension polymerization method. Among these, from the viewpoints of the production cost for the acrylic polymer, environmental burden caused by the use of solvents or the like, and productivity, bulk polymerization is preferred.

Regarding the method for producing a powder of an acrylic polymer, for example, similarly to the method described in JP 2006-193647 A, a method of polymerizing a monomer mixture dispersed in water using a dispersion stabilizer, subsequently vacuum drying the monomer mixture after a washing and dehydration treatment, and thereby obtaining a powder may be mentioned. Furthermore, as the method for producing a pellet of an acrylic polymer, for example, a method of obtaining a pellet by extruding the powder obtained by the method described above, and similarly to the method described in JP 2000-26507 A, a method of bulk polymerizing a monomer mixture in a reactor, and obtaining a pellet by extruding the polymerization product while separating and removing unreacted monomers, may be mentioned.

Regarding the form of polymerization process, a known polymerization methods such as radical polymerization method or anionic polymerization method can be used.

In the following, the conditions in the case of radical polymerization will be described.

Examples of a radical polymerization initiator include the following compounds.

Azo-based polymerization initiators such as 2,2'-azobis(4-methoxy-2,4-dimethylvaleronitrile), 2,2'-azobisisobutyronile, and 2,2'-azobis-(2,4-dimethylvaleronitrile); and organic peroxide-based polymerization initiators such as lauroyl peroxide, diisopropyl peroxydicarbonate, benzoyl peroxide, bis(4-t-butylcyclohexyl) peroxydicarbonate, t-butyl peroxyneodecanoate, and t-hexyl peroxypivalate.

These radical polymerization initiator can be used singly or in combination of two or more kinds thereof.

The amount of addition of the radical polymerization initiator is preferably 0.01 parts to 1 part by mass relative to 100 parts by mass of the total amount of the raw material monomers for obtaining the polymer (A).

The polymerization temperature is preferably 40° C. or higher, and more preferably 50° C. or higher. Furthermore, the polymerization temperature is preferably 180° C. or lower, and more preferably 150° C. or lower. The polymerization temperature is preferably from 40° C. to 180° C., and more preferably from 50° C. to 150° C.

The polymerization time is appropriately determined depending on the progress of polymerization. The polymerization time may be appropriately determined depending on the progress of polymerization curing. The polymerization time is, for example, 3 minutes to 24 hours.

At the time of polymerization, according to necessity, stabilizers such as a chain transfer agent, an oxidation inhibitor, and an ultraviolet absorber; and various additives such as a flame retardant, a dye, a pigment, and a mold releasing agent, can be added.

Examples of the chain transfer agent include the following compounds.

Compounds having —SH groups at the ends, such as terpinolene, an α-methylstyrene dimer, n-dodecylmercaptan, 1,2-ethanedithiol, and 1,10-dimethylcaptodecane; compounds having a structure obtained by substituting two or more of —OH groups of a polyhydric alcohol with —SH groups, such as triethylene glycol dimercaptan, 1,4-dimercapto-2,3-butanediol, and 2,3-dimercapto-1-propanol; compounds having one —SH group, one —OH group, and at least one COOH group in the molecule, such as thioglycolic acid, 2-mercaptopropionic acid, 3-mercaptopropionic acid, thioglycerol, and thioglycol; ester compounds between thioglycolic acid, 2-mercaptopropionic acid, 3-mercaptopropionic acid or the like and a polyhydric alcohol, such as ethylene glycol dithioglycolate, trimethylolpropane tris(β-thiopropionate), trimethylolpropane tris(thioglycolate), pentaerythritol tetrakis(β-thiopropionate), and pentaerythritol tetrakis(thioglycolate); and 1,5-dimercapto-3-thiopentane.

A "polyhydric alcohol" means an alcohol having two or more hydroxyl groups in the molecule.

The amount of addition of a chain transfer agent is preferably 0.001 parts to 1 part by mass relative to 100 parts by mass of the total amount of the raw material monomers for obtaining the polymer (A).

<High Dielectric Material (B)>

The high dielectric material (B) is a compound having a relative dielectric constant at 20° C. of 10 or more, a melting point of 45° C. or lower, and a boiling point of 150° C. or higher.

The relative dielectric constant at 20° C. of the high dielectric material (B) is higher; it is preferable. However, for example, the relative dielectric constant at 20° C. is desirably 150 or less.

The relative dielectric constant at 20° C. of the high dielectric material (B) is preferably 10 to 150, and more preferably 50 to 150.

Regarding the measuring methods of the relative dielectric constant, for example, the electrostatic capacitance is measured in an environment at 20° C. and a relative humidity of 50% using an impedance analyzer (4294A) (trade name) manufactured by Agilent Technologies, Inc., and the relative dielectric constant can be calculated from the measured electrostatic capacitance, the sample thickness and the electrode size. According to the present invention, the relative humidity refers to the proportion of the measured value of the amount of water vapor relative to the maximum amount of water vapor which the atmosphere can contain at a certain air temperature (saturated amount of water vapor).

Regarding the high dielectric material (B), for examples, ethylene carbonate (relative dielectric constant: 90), ethylene glycol (relative dielectric constant: 387), propylene carbonate (relative dielectric constant: 65), and γ-butyrolactone (relative dielectric constant: 39) are mentioned. Among the high dielectric materials (B) described above, from the viewpoint of having a high impact resistance enhancing effect, ethylene carbonate and propylene carbonate are preferred.

<Resin Composition>

The resin composition of the present invention includes 100 parts by mass of the polymer (A) and 0.5 parts to 60 parts by mass of the high dielectric material (B). When the content of the high dielectric material (B) in the resin composition is adjusted to 0.5 parts by mass or more relative to 100 parts by mass of the polymer (A), the relative dielectric constant of the resin composition can be controlled within the preferred range. Furthermore, when the content of the high dielectric material (B) in the resin composition is adjusted to 60 parts by mass or less relative to 100 parts by mass of the polymer (A), a resin composition having high transparency can be obtained.

It is preferable that the resin composition includes 7.5 parts to 15 parts by mass of the high dielectric material (B), and more preferably 10 parts to 13 parts by mass, relative to 100 parts by mass of the polymer (A).

An example of the method for producing the resin composition is a method of mixing the monomers as raw materials of the polymer (A), a polymerization initiator, and the high dielectric material (B), and polymerizing the mixture.

Preferable ranges for the amounts of addition of the polymerization initiator and the additives that can be used when the resin composition is manufactured, and preferable ranges for the polymerization temperature and the polymerization time can be set to be similar to the conditions employed in the case of producing the polymer (A).

Examples of the form of the resin composition include a powder and a pellet.

According to the present invention, stabilizers such as an impact resistance improving agent, an oxidation inhibitor, and an ultraviolet absorber; and various additives such as a flame retardant, a dye, a pigment, and a mold releasing agent, can be added to the resin composition.

Furthermore, according to the present invention, a high dielectric solid, which is a solid at 45° C., can be added, if necessary.

Regarding the high dielectric solid, for example, barium titanate, strontium titanate, titanium oxide, and Rochelle salt are mentioned.

Furthermore, according to the present invention inorganic fine particles can be added for the purpose of increasing rigidity or improving heat resistance. Examples of the inorganic fine particles include fine particles of silica, titanium oxide, alumina, magnesium fine powder, silicic acid, magnesium silicate aluminate, and nickel fine powder. The inorganic fine particles are preferably silica fine particles from the viewpoint of having satisfactory transparency.

According to the present invention, for the purpose of increasing the dielectric constant, additives such as phosphoric acid, phosphoric acid esters, ionic liquids, ethylene glycol, diethylene glycol, propylene glycol, and polyethylene glycol may also be added according to the purpose. Examples of the phosphoric acid esters include dibutyl phosphate, monobutyl phosphate, dimethyl phosphate, monomethyl phosphate, diethyl phosphate, and monoethyl phosphate.

According to an embodiment of the present invention, there is provided a resin composition including polymethyl methacrylate, or an acrylic copolymer (A-1) containing 40% by mass or more and less than 100% by mass of a methyl methacrylate unit; and more than 0% and 60% by mass or less of another vinyl monomer unit, relative to the total mass of the acrylic copolymer, and 0.5 parts to 60 parts by mass of ethylene carbonate.

<Resin Sheet>

The resin sheet of the present invention is a sheet containing a resin composition.

Regarding the manufacturing method of a resin sheet, a cast polymerization method, an extrusion molding method, and an injection molding method is mentioned. Among these, from the viewpoint of obtaining a transparent resin sheet, a cast polymerization method is preferred, particularly for the applications in which transparency is required, such as optical applications.

In the cast polymerization method, a sheet can be obtained in the following manner. At first, injecting polymerizable raw materials for obtaining a resin sheet, into a template. The template is formed by two sheets of plate-like bodies that are disposed to face each other at a predetermined distance, and a sealing material disposed along the edges of the plate-like bodies. And then injected polymerizing the injected polymerizable raw materials to form a sheet; and then detaching the obtained sheet from the template; and thereby obtaining a sheet.

The form of the template for cast polymerization is not particularly limited, and any known template can be used. As for a template for obtaining a she shaped resin molded product, a template for cell casting and a template for continuous casting are mentioned.

An example of the template used for cell casting polymerization is a mold in which two sheets of plate-like bodies such as inorganic glass plates, chromium-plated metal plates or stainless steel plates, are disposed to face each other at a predetermined distance, and a gasket is disposed along the edges of the plate-like bodies, and a sealed space is formed by the plate-like bodies and the gasket.

An example of the template used for continuous casting polymerization is a mold in which a sealed space is formed by the facing planes of a pair of endless belts that run at the same speed in the same direction, and a gasket that is disposed at the two lateral sides of the endless belts and runs at the same speed as the endless belts.

Regarding the polymerization method in the case of using the cast polymerization method, for example, a similar methods as the method for producing an acrylic polymer described above may be used.

It is preferable that the resin sheet has a thickness of from 0.2 mm to 15 mm.

According to the present specification, the thickness of a resin sheet, a functional layer or the like refers to a value obtained by taking an image of a cross-section produced by cutting a resin sheet, a functional layer or the like in a perpendicular direction using a differential interference microscope, measuring shortest dimension from the largest surface of the resin sheet, functional layer or the like to the surface opposite to that largest surface, at five arbitrary sites, and calculating the average value of the measured values.

According to the present invention, in regard to the transmittance of the resin sheet, the value of the total light transmittance measured according to ISO 13468-1:1996 can be used. The transmittance of the resin sheet is preferably 80% or higher, and more preferably 88% or higher. According to the present invention, in regard to the haze value of the resin sheet, the value of haze measured according to ISO 14782:1999 can be used. The haze value of the resin sheet is preferably 2% or less, and more preferably 1% or less.

<Functional Layer>

Regarding the functional layer, a following layer is mentioned, the layer which have at least one of various functions such as scratch resistance, antireflection properties, antiglare properties, antifouling properties, antistatic properties, scattering preventive properties, pressure-sensitive adhesiveness, adhesiveness, and softness.

The functional layer can be provided as a single layer or as a multilayer composed of two or more layers, as necessary.

The functional layer can be provided as, for example, a layer of a cured product of a curable composition.

Regarding the curable composition, a thermally curable composition and au active energy ray-curable composition are mentioned.

Examples of the thermally curable composition include a radical polymerizable composition containing a vinyl monomer, and a poly-condensation reaction type curable composition containing a compound such as an alkoxysilane or an alkylalkoxysilane. These composition can be used singly or in combination of two or more kinds thereof. When the thermally curable composition is cured, for example, the composition is heated for 0.5 hours to 4 hours at 60° C. to 180° C.

Regarding the active energy rays that cure an active energy ray-curable composition, an electron beam, radioactive rays, and ultraviolet radiation are mentioned. In the case of using active energy rays, the cumulative light amount of the active energy rays is preferably 5 mJ/cm$^2$ to 2,000 mJ/cm$^2$.

The curable compositions can be used singly or in combination of two or more kinds thereof.

From the viewpoint of the productivity or physical properties of the resin laminate, an ultraviolet-curable composition is preferable as for the curable composition.

Regarding the ultraviolet-curable composition, for example, a composition including a compound having at least two (meth)acryloyloxy groups in the molecule and an ultraviolet polymerization initiator, may be used.

The compound having at least two (meth)acryloyloxy groups in the molecule is, for example, a polyfunctional monomer in which the residue that links the respective (meth)acryloyloxy groups is a hydrocarbon group or a derivative thereof, and the polyfunctional monomer may contain an ether bond, a thioether bond, an ester bond, an amide bond, a urethane bond or the like in the molecule.

Examples of the compound having at least two (meth)acryloyloxy groups in the molecule include the following compounds.

An esterification product obtainable from one mole of a polyhydric alcohol and two or more moles of (meth)acrylic acid or a derivative thereof; and an esterification product obtainable from a polyhydric alcohol, a polyvalent carboxylic acid or an anhydride thereof, and (meth)acrylic acid or a derivative thereof.

Meanwhile, the term "polyhydric alcohol" as used herein means an alcohol having two or more hydroxyl groups in the molecule.

The term "polyvalent carboxylic acid" means a carboxylic acid having two or more carboxyl groups in the molecule.

The term "derivative of (meth)acrylic acid" means a compound obtainable by substituting a functional group or a hydrogen atom of a (meth)acrylic acid compound with another functional group.

The term "derivative of a polyvalent carboxylic acid" means a compound obtainable by substituting a functional group or a hydrogen atom of a polyvalent carboxylic acid with another functional group.

Specific examples of the esterification product obtainable from one mole of a polyhydric alcohol and two or more moles of (meth)acrylic acid or a derivative thereof, include the following compounds.

Alkanediol di(meth)acrylates such as ethylene glycol di(meth)acrylate, 1,2-propylene glycol di(meth)acrylate, 1,3-butylene glycol di(meth)acrylate, 1,6-hexanediol di(meth)acrylate, and neopentyl glycol di(meth)acrylate; polyoxyalkylene glycol di(meth)acrylates such as diethylene glycol di(met ac late, dipropylene glycol di(meth)acrylate, triethylene glycol di(meth)acrylate, tetraethylene glycol di(meth)acrylate, and polyethylene glycol di(meth)acrylate; polyfunctional polymerizable compounds each having two or more ethylenically unsaturated bonds in the molecule, such as divinylbenzene; and unsaturated polyester prepolymers derived from at least one polyvalent carboxylic acid including an ethylenically unsaturated polycarboxylic acid, and at least one diol.

Poly(meth)acrylates of trifunctional or higher-functional polyols, such as trimethylolpropane tri(meth)acrylate, trimethylolethane tri(meth)acrylate, pentaglycerol tri(meth)acrylate, pentaerythritol tri(meth)acrylate, pentaerythritol tetra(meth)acrylate, glycerin tri(meth)acrylate, dipentaerythritol tri(meth)acrylate, dipentaerythritol tetra(meth)acrylate, dipentaerythriol penta(meth)acrylate, dipentaerythritol hexa(meth)acrylate, tripentaerythritol tetra(meth)acrylate, tripentaerythritol penta(meth)acrylate, tripentaerythritol hexa(meth)acrylate, and tripentaerythritol hepta(meth)acrylate.

Examples of the combination of a polyhydric alcohol, a polyvalent carboxylic acid or an anhydride thereof, and (meth)acrylic acid or a derivative thereof, include the following combinations.

Malonic acid/trimethylolethane/(meth)acrylic acid, malonic acid/trimethylolpropane/(meth)acrylic acid, malonic acid/glycerin/(meth)acrylic acid, malonic acid/pentaerythritol/(meth)acrylic acid, succinic acid/trimethylolethane/meth)acrylic acid, succinic acid/trimethylolpropane/(meth)acrylic acid, succinic acid/glycerin/(meth)acrylic acid, succinic acid/pentaerythritol/(meth)acrylic acid, adipic acid/trimethylolethane/(meth)acrylic acid, adipic acid/trimethylolpropane/(meth)acrylic acid, adipic acid/glycerin/(meth)acrylic acid, adipic acid/pentaerythritol/(meth)acrylic acid, glutaric acid/trimethylolethane/(meth)acrylic acid, glutaric acid/trimethylolpropane/(meth)acrylic acid, glutaric acid/glycerin/(meth)acrylic acid, glutaric acid/pentaerythritol/(meth)acrylic acid, sebacic acid/trimethylolethane/(meth)acrylic acid, sebacic acid/trimethylolpropane/(meth)acrylic acid, sebacic acid/glycerin/(meth)acrylic acid, sebacic acid/pentaerythritol/(meth)acrylic acid, fumaric acid/trimethylolethane/(meth)acrylic acid, fumaric acid/trimethylolpropane/(meth)acrylic acid, fumaric acid/glycerin/(meth)acrylic acid, fumaric acid/pentaerythritol/(meth)acrylic acid, itaconic acid/trimethylolethane/(meth)acrylic acid, itaconic acid/trimethylolpropane/(meth)acrylic acid, itaconic acid/glycerin/(meth)acrylic acid, itaconic acid/pentaerythritol/(meth)acrylic acid, maleic anhydride/trimethylolethane/(meth)acrylic acid, maleic anhydride/trimethylolpropane/(meth)acrylic acid, maleic anhydride/glycerin/(meth)acrylic acid, and maleic anhydride/pentaerythritol/(meth)acrylic acid.

Other specific examples of the compound having at least two (meth)acryloyloxy groups in the molecule include the following compounds.

A urethane (meth)acrylate obtainable by reacting 3 or more moles of an acrylic monomer having active hydrogen (for example, 2-hydroxyethyl (meth)acrylate, 2-hydroxypropyl (meth)acrylate, 2-hydroxy-3-methoxypropyl (meth)acrylate, N-methylol (meth)acrylamide, N-hydroxy(meth)acrylamide, 1,2,3-propanetriol-1,3-di(meth)acrylate, or 3-acryloyloxy-2-hydroxypropyl (meth)acrylate per 1 mole of a polyisocyanate obtainable by trimerization of a diisocyanate (for example, trimethylolpropanetoluylene diisocyanate, hexamethylene diisocyanate, tolylene diisocyanate, diphenylmethane diisocyanate, xylene diisocyanate, 4,4'-methylenebis(cyclohexyl isocyanate), isophorone diisocyanate, and trimethylhexamethylene diisocyanate); poly[(meth)acryloyloxyethylene]isocyanurate such as di(meth)acrylate or tri(meth)acrylate of tris(2-hydroxyethyl) isocyanuric acid; epoxy poly(meth)acrylate; and urethane poly(meth)acrylate.

Specific examples of the ultraviolet polymerization initiator used in the ultraviolet-curable composition include the following compounds.

Carbonyl compounds such as benzoin, benzoin methyl ether, benzoin ethyl ether, benzoin isopropyl ether, benzoin isobutyl ether, acetoin, butyroin, toluoin, benzil, benzophenone, p-methoxybenzophenone, 2,2-diethoxyacetophenone, α,α-dimethoxy-α-phenylacetophenone, methyl phenylglyoxylate, ethyl phenylglyoxylate, 4,4'-bis(dimethylamino) benzophenone, 1-hydroxycyclohexyl phenyl ketone, and 2-hydroxy-2-methyl-1-phenylpropan-1-one; sulfur compounds such as tetramethylthiuram monosulfide and tetramethylthiuram disulfide; and phosphorous compounds such as 2,4,6-trimethylbenzoyl diphenylphosphine oxide, bis(2,4,6-trimethylbenzoyl)-phenylphosphine oxide, and benzoyl diethoxyphosphine oxide.

The ultraviolet polymerization initiators can be used singly or in combination of two or more kinds thereof.

The amount of addition of the ultraviolet polymerization initiator is preferably 0.1 parts to 10 parts by mass relative to 100 parts by mass of the compound having at least two meth)acryloyloxy groups in the molecule.

The thickness of the functional layer is, for example, 1 µm to 100 µm.

Examples of the method of applying a curable composition on the surface of a resin sheet include a flow casting method, a gravure coating method, a reverse gravure coating method, a vacuum slot die coating method, a roller coating method, a bar coating method, a spray coating method, an air knife coating method, a spin coating method, a flow coating method, a curtain coating method, a film covering method (UV lamination transfer method), and a dipping method. Among these, a film covering method is preferred from the viewpoint that a coating film obtained from the curable composition has fewer foreign matter defects, and the surface smoothness is satisfactory.

Regarding the method for manufacturing a resin laminate by applying a curable composition by a film covering method, for example, a production method including a step of bonding a resin sheet with a cover film, a curable composition interposed therebetween, and thereby forming a film laminate (pre-curing laminate forming step); a step of curing the curable composition and thereby obtaining a functional layer (post-curing laminate forming step); and a step of peeling the cover film off and thereby obtaining a resin laminate, may be mentioned. When peelable functional layers are formed in advance on the surface of cover films, and the functional layers are laminated on the resin sheet side by a transfer method, a resin laminate having various functions can be produced.

Regarding the cover film, an active energy ray-transmitting film is used, and a known film can be utilized as the active energy ray-transmitting film. Furthermore, any cover film that is peelable to the functional layer is suitable; however, if the cover film has insufficient peelability to the functional layer, a release layer may be provided on the surface of the cover film.

Examples of the active energy ray-transmitting film include synthetic resin films such as a polyethylene terephthalate film, a polypropylene film, a polycarbonate film, a polystyrene film, a polyamide film, a polyamideimide film, a polyethylene film, and a polyvinyl chloride film; cellulose-based films such as a cellulose acetate film; products such as Cellophane, glassine paper, and Japanese paper; composite film-like products of thereof; composite sheet-like products; and products obtained by providing release layers on those film-like products and sheet-like products.

The thickness of the active energy ray-transmitting film is preferably 4 µm to 500 µm, more preferably from 12 µm to 150 µm, and even more preferably from 30 µm to 120 µm. When the thickness of the active energy ray-transmitting film is adjusted to 4 µm to 500 µm, there is a tendency that a transfer film which is free from wrinkles or cracks can be obtained. The thickness of the active energy ray-transmitting film is preferably 4 µm or more, more preferably 12 µm or more, and even more preferably 30 µm or more. Furthermore, the thickness of the active energy ray-transmitting film is preferably 500 µm or less, more preferably 150 µm or less, and even more preferably 120 µm or less.

In regard to the releasing agent for forming the release layer, a known releasing agent such as a polymer or a wax can be appropriately selected and used.

Regarding the method for forming a release layer, for example, a method of forming a release layer by applying a coating material obtained by dissolving at least one of a paraffin wax; an acrylic, urethane-based, silicone-based, melamine-based, urea-based, urea-melamine-based, cellulose-based, and benzoguanamine-based resins; and surfactants, in an organic solvent or water, on a cover film by a conventional printing method such as a gravure printing method, a screen printing method, or an offset printing method, and drying the coating material (curing in the case of a curable coating film of a thermally curable resin, an ultraviolet curable resin, an electron beam-curable resin, a radiation-curable resin or the like), may be mentioned.

The thickness of the release layer is preferably about 0.1 µm to 3 µm. If the release layer is too thin, there is a tendency that it is difficult to peeled off the cover film and on the contrary, if the release layer is too thick, there is a tendency that the cover film is so easily detached that the various layers on the cover film is likely to be delaminated before transfer.

A functional layer having scratch resistance is also referred to as a hard coat layer. The hard coat layer may also have other functions such as, for example, antireflection properties or antiglare properties, in addition to scratch resistance. The thickness of the hard coat layer is preferably 1 µm to 100 µm, and more preferably 5 µm to 50 µm, from the viewpoints of the surface hardness and the external appearance of the resin laminate.

In a case in which an antireflection layer having an antireflection function is laminated as the functional layer, the antireflection layer may be constructed from any material as long as the antireflection layer is a layer having a function of suppressing the amount of light reflected at the resin laminate surface to be from 0% to 20%, preferably from 0% to 10%, and more preferably from 0% to 5%, of the amount of incident light. In order to impart such a function, for example, a method of forming a laminated structure of two or more films having different refractive indices may be used.

In a case in which the antireflection layer is produced to have a laminated structure of two or more kinds of films having different refractive indices, regarding the refractive indices of the various films, the laminated structure is preferably a laminated structure in which, for example, a low-refractive index layer having a refractive index of about 1.3 to 1.5 and a high-refractive index layer having a refractive index of 1.6 to 2.0 are laminated on a resin sheet in the order of the high-refractive index layer and the low-refractive index layer. When the active indices are in these ranges, the reflected light of incident light tends to be sufficiently suppressed.

The film thicknesses of the low-refractive index layer and the high-refractive index layer are not particularly limited; however, the film thicknesses are each preferably 50 µm or more, and more preferably 70 nm or more. Furthermore, the thicknesses are each preferably 200 nm or less, and more preferably 150 nm or less. The film thicknesses of the low-refractive index layer and the high-refractive index layer are each preferably from 50 nm to 200 nm, and more preferably from 70 nm to 150 nm. When the film thicknesses are in this range, there is a tendency that the reflected light of the visible wavelengths can be sufficiently suppressed.

Regarding the low-refractive index layer, a layer having a refractive index of about 1.3 to 1.5 is preferred. An example of the low-refractive index layer is a layer of a main body of siloxane bonds formed from a polycondensation reaction type curable compound such as an alkoxysilane or an alkylalkoxysilane, and specific examples thereof include layers formed from compounds obtained by substituting a portion of the siloxane bonds of siloxane-based resins with a hydrogen atom, a hydroxyl group, an unsaturated group such as an aryl group, or an alkoxy group.

Examples of the component that forms the low-refractive index layer include active energy ray-curable compositions that are curable by an electron beam, radioactive rays, ultraviolet radiation or the like, and thermally curable compositions. These may be used singly, or plural curable compounds may be used in combination.

It is preferable to add colloidal silica to the components that form the low-refractive index layer, from the viewpoint of achieving a lower refractive index.

Colloidal silica is a product produced by dispersing at least one kind of fine particles selected from porous silica and non-porous silica in a dispersing medium, and thereby obtaining a colloidal solution. Here, porous silica is low-density silica which contains porous or hollow and contains air inside. The refractive index of porous silica is about 1.20 to 1.40, and this is low compared to the refractive index of conventional silica, which is 1.45 to 1.47. Therefore, in order to lower the refractive index of the low-refractive index layer in the present invention, it is more preferable to use porous silica as the colloidal silica. Furthermore, according to the present invention, colloidal silica having the surface treated with a silane coupling agent can be used as necessary.

The average particle size of the colloidal silica may be, for example, about 1 nm to 100 nm. Regarding the method for measuring the average particle size of the colloidal silica, for example, the average particle size can be measured by a known measurement method such as a dynamic light scattering method.

Regarding the high-refractive index layer, a layer having a refractive index of about 1.6 to 2.0 is preferred.

An example of the high-refractive index layer may be a metal oxide film obtainable by hydrolyzing a metal alkoxide and then condensing the hydrolysate.

An example of the metal alkoxide is a compound represented by the following Formula (1):

$$M(OR)_m \quad (1)$$

(wherein in Formula (1), M represents a metal atom; R represents a hydrocarbon group having 1 to 5 carbon atoms; and m represents the valence of the metal atom (3 or 4).) The metal atom M is preferably titanium, aluminum, zirconium or tin in view of the refractive index of the high-refractive index layer, and titanium is more preferred.

Specific examples of the metal alkoxide include the following compounds.

Titanium methoxide, titanium ethoxide, titanium n-propoxide, titanium isopropoxide, titanium n-butoxide, titanium isobutoxide, aluminum ethoxide, aluminum isopropoxide, aluminum butoxide, aluminum t-butoxide, tin t-butoxide, zirconium ethoxide, zirconium n-propoxide, zirconium isopropoxide, and zirconium n-butoxide.

According to the present invention, from the viewpoint of achieving an even higher refractive index of the metal oxide film described above, it is preferable that at least one kind of fine particles selected from $ZrO_2$, $TiO_2$, NbO, ITO, ATO, $SbO_2$, $In_2O_3$, $SnO_2$ and ZnO, which are metal oxides having high refractive indices, are dispersed e metal oxide films described above.

According to the present invention, as the high-refractive index layer, in addition to the above-described metal oxide film, for example, a film obtained by curing a dispersion of high-refractive index metal oxide fine particles in an ultraviolet-curable mixture for forming a hard coat layer, can be used. In this case, regarding the high-refractive index metal oxide fine particles, surface-treated metal oxide fine particles may also be used.

Regarding the method for forming the antireflection layer, for example, a method of laminating a low-refractive index film and a high-refractive index film by a flow casting method, a roller coating method, a bar coating method, a spray coating method, an air knife coating method, a spin coating method, a flow coating method, a curtain coating method, a film covering method, or a dipping method, may be used.

According to the present invention, it is preferable that at least one layer of an adhesive layer and a hard coat layer is formed between the antireflection layer and the resin sheet. When an adhesive layer is formed between the antireflection layer and the resin sheet, the adhesiveness between the antireflection layer and the resin sheet is improved. When a hard coat layer is formed between the antireflection layer and the resin sheet, the surface hardness of the antireflection layer is improved.

In a case in which an antiglare layer having an antiglare function is laminated as the functional layer, reflection of external light can be suppressed by at least one method of a method of forming fine concavo-convexities on the surface of the antiglare layer, and a method of adding light diffusing fine particles into the antiglare layer and causing diffuse reflection of external light through internal scattering. In the case of an antiglare layer having fine concavo-convexities on the surface, a specific example of the shape of the surface unevenness may be a shape for which the center-line average surface roughness is 0.05 μm to 0.3 μm, and the surface unevenness pitch is 30 μm to 200 μm.

The thickness of the antiglare layer is preferably 3 μm to 30 μm, and more preferably 4 μm to 15 μm. When the film thickness is 3 μm or more, there is a tendency that a high antiglare performance is obtained, and when the film thickness is 30 μm or less, there is a tendency that curling of the resin sheet of the present invention can be suppressed.

One embodiment of the antiglare layer is a hard coat layer having an antiglare function. Regarding the method for forming a hard coat layer having an antiglare function, for example, the following methods may be mentioned . . . .

First, an ultraviolet-curable mixture for forming the above-described hard coat layer is applied on an active energy ray-transmitting film having fine concavo-convex shapes, subsequently the mixture is cured, and thereby a hard coat layer is formed. Thereafter, the active energy ray-transmitting film having the hard coat layer laminated thereon is laminated on the surface of a resin sheet such that the surface of the hard coat layer is brought into contact with the resin sheet, and then the active energy ray-transmitting film is peeled off. Thereby, a laminate in which an antiglare layer having a surface with the fine concavo-convex shapes is laminated on the surface of a resin sheet, is obtained.

In a case in which a hard coat layer is laminated on the surface of the resin sheet, an adhesive can be used, if necessary.

Furthermore, in order to improve the releasability between the active energy ray-transmitting film and the fine concavo-convex surface of the hard coat layer, if necessary, a mold releasing agent can be added to the ultraviolet-curable mixture for forming the hard coat layer.

Regarding the method of forming fine concavo-convex shapes on the surface of an active energy ray-transmitting film, a method of forming concavo-convex shapes on the surface itself of the active energy ray-transmitting film; and a method of imparting concavo-convex shapes to the surface of a smooth active energy ray-transmitting film by a coating method may be mentioned.

Regarding the method of imparting concavo-convex shapes to the surface itself of an active energy ray-transmitting film, a method of kneading particles into the resin for forming the active energy ray-transmitting film; and a method of transferring the fine concavo-convex shapes of a mold surface in a state in which the resin for forming the active energy ray-transmitting film has been heated to a temperature higher than or equal to the glass transition temperature may be mentioned.

Regarding the method of imparting concavo-convex shapes to the surface of a smooth active energy ray-transmitting film by a coating method, a method of applying an antiglare coating agent on the surface of an active energy ray-transmitting film; and a method of casting a curable composition between an active energy ray-transmitting film and a mold having a fine concavo-convex surface, curing the curable composition, and then detaching the cured product from the mold (2P method) may be mentioned.

Regarding the method for producing a mold having a fine concavo-convex surface, for example, a method of forming fine concavo-convex shapes by a method such as a sand blasting method, a chemical etching method, or a lithographic printing method, may be used. The shape of the mold is preferably a roll shape from the viewpoint of having satisfactory productivity.

In a case in which an antifouling layer having an antifouling function is laminated as the functional layer, the antifouling layer may be water-repellent or oil-repellent, or may be hydrophilic or oleophilic; however, from the viewpoint that fouling can be easily removed, a water-repellent layer that is water-repellent or oil-repellent is preferred. Being water-repellent implies that, for example, the value of the contact angle against water is 100° to 120°.

Regarding the raw material for forming a water-repellent layer, it is preferable to use an ultraviolet-curable mixture including a compound having at least two h)acryloyloxy groups in the molecule, a (meth)acrylate having a fluorine atom, and an ultraviolet polymerization initiator, from the viewpoint of productivity.

A (meth)acrylate having a fluorine atom is an essential component for exhibiting the water-repellent/oil-repellent performance (antifouling properties) of the water-repellent layer.

Regarding the (meth)acrylate having a fluorine atom, any known h)acrylate having a fluorine atom can be used.

Examples of a commercially available product of the (meth)acrylate having a fluorine atom include the following products.

"VISCOAT 17F" (trade name) manufactured by Osaka Organic Chemical Industry, Ltd., which is heptadecanefluorodecyl acrylate; "LIGHT ACRYLATE FA-108" (trade name) manufactured by Kyoeisha Co., Ltd., which is perfluorooctyl ethyl acrylate; and "16-FDA" (trade name) manufactured by Kyoeisha Co., Ltd., which is 1,10-bis(meth)acryloyloxy-2,2,3,3,4,4,5,5,6,6,7,7,8,8,9,9-hexadecafluorodecane.

From the viewpoint of obtaining satisfactory water-repellent/oil-repellent performance of the water-repellent layer, the (meth)acrylate having a fluorine atom is preferably a (meth)acrylate having a perfluoropolyether group. Examples of a commercially available product of a (meth)acrylate having a perfluoropolyether group include "OPTOOL DAC" (trade name) manufactured by Daikin Industries, Ltd.; and "EXP RS-503" and "EXP RS-751-k" manufactured by DIC Corp.

The (meth)acrylates having fluorine atoms can be used singly or in combination of two or more kinds thereof.

The amount of addition of the (meth)acrylate having a fluorine atom is preferably 0.1 parts to 2 parts by mass relative to 100 parts by mass of the compound having at least two (meth)acryloyloxy groups in the molecule. When the amount of addition of the (meth)acrylate having a fluorine atom is 0.1 parts by mass or more, the water-repellent layer tends to have sufficient water-repellent/oil-repellent performance. Furthermore, when the amount of addition of the (meth)acrylate having a fluorine atom is 2 parts by mass or less, the water-repellent layer tends to have satisfactory curability and transparency.

The amount of addition of the ultraviolet polymerization initiator is preferably 0.1 parts to 10 parts by mass relative to 100 parts by mass of the compound having at least two (meth)acryloyloxy groups in the molecule.

The film thickness of the water-repellent layer is preferably 0.1 μm or more, and more preferably 1 μm or more. Furthermore, the film thickness of the water-repellent layer is preferably 15 μm or less, and more preferably 10 μm or less. The film thickness of the water-repellent layer is preferably from 0.1 μm to 15 μm, and more preferably from 1 μm to 10 μm. When the film thickness is in the range described above, there is a tendency that a water-repellent layer having sufficient surface hardness and transparency is obtained, the warpage of the film caused by the water-repellent layer is also small, and the external appearance tends to become satisfactory.

Since the (meth)acrylate having a fluorine atom in the ultraviolet-curable mixture described above has low surface tension, the (meth)acrylate having a fluorine atom tends to gather easily at the interface with air, at which the surface tension is lower than the interface with the active energy ray-transmitting film having relatively high surface tension. Therefore, in a case in which the water-repellent layer is laminated on the surface of a resin sheet by a transfer method, a larger amount the (meth)acrylate having a fluorine atom tends to exist at the interface with the resin sheet (hereinafter, referred to as being "oriented"), and the water-repellent layer at the surface layer of the resin laminate thus obtained tends to have insufficient water-repellency.

In order to orient the (meth)acrylate having a fluorine atom at the interface with the active energy ray-transmitting film, it is preferable to form a coating layer having fluorine atoms on the active energy ray-transmitting film, and to form the water-repellent layer thereon.

The coating layer containing fluorine atoms can be obtained by applying a fluorine-containing coating agent including a known fluorocompound and an organic solvent on a film, and then volatilizing the organic solvent.

Regarding the fluorocompound, a fluorocompound represented by the following Formula (2) is preferable from the viewpoint that a coating layer having low surface tension can be formed.

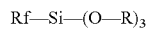

$$Rf-Si-(O-R)_3 \quad (2)$$

(wherein in Formula (2), Rf represents an organic functional group having a fluorine atom; and R represents an alkyl group having 1 to 3 carbon atoms.) The fluorocompound included in the fluorine-containing coating agent described above is a component which has low surface tension on the film surface is intended to form the coating layer having high water-repellent/oil-repellent performance that will be described below.

The fluorocompound has Rf, which is an organic functional group having a fluorine atom; however, from the viewpoint of the water-repellent/oil-repellent performance of the coating layer and from the viewpoint of the adhesiveness to the film, Rf is preferably a perfluoroalkyl group or a perfluoropolyether group. R represents an alkyl group having 1 to 3 carbon atoms.

The fluorocompounds can be used singly or in combination of two or more kinds thereof.

From the viewpoint of obtaining a coating layer having high water-repellent/oil-repellent performance, it is preferable that the fluorocompound is included in the fluorine-containing coating agent in an amount of 0.02% to 0.2% by mass relative to the total mass of the fluorine-containing coating agent.

Regarding the organic solvent that is included in the fluorine-containing coating agent, an organic solvent having excellent compatibility with the fluorocompound can be used. Furthermore, the organic solvent included in the fluorine-containing coating agent is used in order to control the viscosity of the fluorine-containing coating agent, the drying speed, and the thickness of the coating layer.

The thickness of the coating layer having fluorine atoms is preferably 2 nm or more, and more preferably 5 nm or more. Furthermore, the thickness of the coating layer having fluorine atoms is preferably 20 nm or less, and more preferably 15 nm or less. The thickness of the coating layer having fluorine atoms is preferably from 2 μm to 20 nm, and more preferably from 5 nm to 15 nm. When the film thickness is in the range described above, there is a tendency that a film having satisfactory external appearance and having high water-repellent/oil-repellent performance can be obtained by forming a water-repellent layer on the coating layer having fluorine atoms.

Furthermore, a coating layer containing these fluorocompounds represented by Formula (2) may also be formed directly on the surface of the resin sheet or the resin laminate. Particularly, the present technique is suitably used in a case in which the water-repellent/oil-repellent function is imparted to a resin laminate having an antireflection layer formed thereon, or to a resin laminate on which a hard coat layer having very high hardness such as a pencil hardness of 6H or higher is formed.

Examples of the organic solvent include a non-fluorosolvent such as a hydrocarbon-based solvent, and a fluorosolvent. The organic solvent is preferably a fluorosolvent, from the viewpoint of having excellent compatibility with fluorocompounds.

Examples of the non-fluorosolvent include the following compounds.

Ketones such as methyl ethyl ketone, acetone, and methyl isobutyl ketone; alcohols, such as monohydric alcohols such as ethanol, 1-propanol, 2-propanol, butanol, and 1-methoxy-2-propanol, and polyhydric alcohols such as ethylene glycol, diethylene glycol, and propylene glycol; esters such as ethyl acetate, butyl acetate, and γ-butyrolactone; ethers such as diethylene glycol monomethyl ether, diethylene glycol monomethyl ether acetate, tetrahydrofuran, and 1,4-dioxane; aromatic hydrocarbons such as toluene and xylene; and amides such as dimethylformamide, dimethylacetamide, and N-methylpyrrolidone.

Examples of the fluorosolvent include a fluoroalcohol, a fluoroether, and ditrifluoromethylbenzene.

The organic solvents can be used singly or in combination of two or more kinds thereof.

Regarding the fluorine-containing coating agent, any one of a method of mixing required amounts of a fluorocompound and an organic solvent, and appropriately adjusting the concentration or the viscosity, and a method of using a commercially available product in which a fluorocompound and an organic solvent have been already mixed, and adding an organic solvent thereto as necessary, may be used.

Examples of a commercially available product of the fluorine-containing coating agent include "FLUOROSURF FG5010" (trade name) manufactured by Fluoro Technology Co., Ltd.; "OPTOOL DSX" and "OPTOOL AES-4" (all trade names) manufactured by Daikin Industries, Ltd.; and "NOVEC EGC-1720" (trade name) manufactured by Sumitomo 3M, Ltd. When these commercially available products are used, the content of the fluorocompound can be adjusted by appropriately adding an organic solvent.

Regarding the method of applying a fluorine-containing coating agent on a film surface, for example, a method similar to the method of forming an antireflection layer described above, may be used.

A coating layer having fluorine atoms can be obtained by, for example, applying a fluorine-containing coating agent on a film, and subsequently performing a drying treatment of volatilizing the organic solvent.

Since a fluorine-containing coating agent as low surface tension, and at the time of coating, the fluorine-containing coating agent easily bursts open, it is preferable to applying the fluorine-containing coating agent by a film covering method. Furthermore, from the viewpoint of enhancing the scratch resistance of the water-repellent layer, and from the viewpoint of preventing incorporation of bubbles and dust that are causative of defective finish, it is preferable that the fluorine-containing coating agent is cured in an anaerobic atmosphere in which there is no chance of inhibition of polymerization caused by oxygen or the like.

Since the obtained coating layer containing fluorine atoms has low surface tension and has high water-repellent/oil-repellent performance, when the water-repellent layer is transferred, the (meth)acrylate having a fluorine atom, which is included in the ultraviolet-curable mixture that forms the water-repellent layer, is likely to be oriented on the surface side that is brought into contact with the coating layer of the fluorine-containing coating agent, and the water-repellency/oil-repellency of the water-repellent layer on the resin laminate thus obtainable is enhanced. The contact angle against water of the water-repellent layer surface on the resin laminate is preferably from 100° to 120°, and more preferably from 105° to 120°.

Regarding the method of applying a fluorine-containing coating agent containing the (meth)acrylate having a fluorine atom on a coating layer of an active energy ray-transmitting film in which the coating layer containing fluorine atoms is laminated thereon, for example, a method similar to the method for forming an antireflection layer described above may be used.

Regarding the fluorine-containing coating agent, for example, a coating agent that is cured by cove energy rays such as an electron beam, radioactive rays, or ultraviolet radiation, may be used.

In the following description, one of production examples for a resin laminate in which a water-repellent layer is laminated by a film covering method, will be described in detail.

A fluorine-containing coating agent is applied on an active energy ray-transmitting film. The fluorine-containing coating agent is dried to form a coating layer having fluorine atoms, and then an ultraviolet-curable mixture including a (meth)acrylate having a fluorine atom is applied on the coating layer having fluorine atoms. Subsequently, an arbitrary surface of another active energy ray-transmitting film as a cover film and the coated surface of the ultraviolet-curable mixture of the active energy ray-transmitting film coated with the ultraviolet-curable mixture are arranged to face each other and are pressed with a press roll. Thereby, a laminate in which the active energy ray-transmitting film, the coating layer having fluorine atoms, the ultraviolet-curable mixture coated film, and the cover film are laminated in sequence is formed. This laminate is irradiated with ultraviolet radiation using an ultraviolet irradiation apparatus, through a film on the cover film surface side, and thereby the ultraviolet-curable mixture is cured.

According to an embodiment of the present invention, it is preferable to provide a retention time after the formation of the laminate, until the irradiation with active energy rays.

The retention time is preferably 0.5 minutes to 5 minutes in consideration of the (meth)acrylate having a fluorine atom being oriented on the surface side of the coating layer having fluorine atoms in the ultraviolet-curable mixture. After curing of the ultraviolet-curable mixture, the cover film is peeled off, and thereby a resin laminate having a water-repellent layer laminated therein can be obtained.

A case in which an antistatic layer having an antistatic function is laminated as the functional layer will be described below.

For the antistatic layer, it is preferable to use an ultraviolet-curable mixture for an antistatic layer, which includes a compound having at least two (meth)acryloyloxy groups in the molecule, an antistatic component and an ultraviolet polymerization initiator, from the viewpoint of productivity.

Examples of the antistatic component include an electron-conductive type organic compound, electrically conductive particles, and an ion-conductive type organic compound. The antistatic component is preferably an electron-conductive type antistatic component such as a π-conjugated electrically conductive organic compound or electrically conductive fine particles, from the viewpoint that the compound is not easily affected by environmental changes, has stabilized electrical conduction performance, and exhibits satisfactory electrical conduction performance particularly even in a low humidity environment.

Examples of the π-conjugated electrically conductive organic compound include aliphatic conjugated polyacetylene, aromatic conjugated poly(para-phenylene), heterocyclic conjugated polypyrrole, polythiophene, polythiophene-based electrically conductive polymer, heteroatom-containing conjugated polyaniline, and mixed type conjugated poly(phenylenevinylene). Among these, from the viewpoint of transparency of the antistatic layer, a polythiophene-based electrically conductive polymer is preferred.

Examples of the electrically conductive fine particles include various carbon-based, metal-based, metal oxide-based, and electrically conductive coated fine particles.

Examples of carbon-based fine particles include the following particles.

Carbon powders of carbon black, Ketjen black, acetylene black, and the like; carbon fibers such as PAN-based carbon fibers and pitch-based carbon fibers; and carbon flakes of an expanded graphite pulverization product.

Examples of metal-based fine particles include the following particles.

Powders and metal flakes of metals such as aluminum, copper, gold, silver, nickel, chromium, iron, molybdenum, titanium, tungsten and tantalum, and of alloys containing those metals; and metal fibers of iron, copper, stainless steel, silver-plated copper, brass and the like.

Examples of metal oxide-based fine particles include the following particles.

Fine particles of tin oxide, antimony-doped tin oxide (ATO), indium oxide, tin-doped indium oxide (ITO), zinc oxide, aluminum-doped zinc oxide, zinc antimonate, antimony pentoxide, and the like.

Examples of electrically conductive coated fine particles include the following particles.

Electrically conductive fine particles obtained by coating the surfaces of various fine particles of titanium oxide (spherical and needle-like), potassium titanate, aluminum borate, barium sulfate, mica and the like, with antistatic components such as tin oxide, ATO and ITO; and resin beads of polystyrene, an acrylic resin, an epoxy resin, a polyamide resin, a polyurethane resin and the like, which are surface-treated with metals such as gold and nickel.

Examples of electrically conductive fine particles include the following particles.

Metal-based fine particles of gold, silver, a silver/palladium alloy, copper, nickel, aluminum and the like; and metal oxide-based fine particles of tin oxide, ATO, ITO, zinc oxide, aluminum-doped zinc oxide and the like.

The mass average particle size of the primary particles of the electrically conductive fine particles is preferably 1 nm or more, from the viewpoint of electrical conductivity of the antistatic layer. Furthermore, the mass average particle size of the primary particles of the electrically conductive fine particles is preferably from 1 nm to 200 nm, more preferably from 1 nm to 150 nm, even more preferably from 1 nm to 100 nm, and particularly preferably from 1 nm to 80 nm, from the viewpoint of transparency of the antistatic layer. The mass average particle size of the electrically conductive fine particles can be measured by a light scattering method or using electron microscopic photographs.

The amount of addition of the ultraviolet polymerization initiator is preferably 0.1 parts by mass or more relative to 100 parts by mass of the ultraviolet-curable mixture for an antistatic layer from the viewpoint of curability by means of ultraviolet irradiation, and the amount of addition is preferably 10 parts by mass or less relative to 100 parts by mass of the ultraviolet-curable mixture for an antistatic layer from the viewpoint of maintaining a satisfactory color tone of the antistatic layer.

In the ultraviolet-curable mixture for an antistatic layer, various additives such as a slip property enhancing agent, a leveling agent, inorganic fine particles, and photostabilizers (an ultraviolet absorber, HALS, and the like) can be added as necessary. From the viewpoint of transparency of the laminate, the amount of addition of the additives is preferably 10 parts by mass or less relative to 100 parts by mass of the ultraviolet-curable mixture for an antistatic layer.

The film thickness of the antistatic layer is preferably 0.1 μm or more, and more preferably 0.5 μm or more. Furthermore, the film thickness of the antistatic layer is preferably 10 μm or less, and more preferably 7 μm or less. The film thickness of the antistatic layer is preferably from 0.1 μm to 10 μm, and more preferably from 0 μm to 7 μm. When the film thickness of the antistatic layer is in the range described above, the antistatic layer has sufficient surface hardness, antistatic performance and transparency, the resin laminate has less warpage, and the external appearance tends to become satisfactory.

The surface resistance value of the antistatic layer is preferably 10$^{10}$Ω/□ or less, and more preferably 10$^{8}$Ω/□ or less, from the viewpoint of the antistatic properties of the resin laminate. The surface resistance value of the antistatic layer is preferably from 10$^{1}$Ω/□ to 10$^{10}$Ω/□, more preferably from 10$^{1}$Ω/□ to 500Ω/□, and even more preferably from 10$^{1}$Ω/□ to 10$^{8}$ Ω/□.

The surface resistance value can be measured by, for example, the following method. The surface resistance value (Ω/□) is measured on the cured coating layer side of the resin laminate at an applied voltage of 500 V after 1 minute, under the conditions of a measurement temperature of 23° C. and a relative humidity of 50%, using a super insulation resistance meter (manufactured by TOA Corp., trade name: ULTRA MEGOHMMETER MODEL SM-10E).

Regarding the method for forming an antistatic layer, for example, a method similar to the method for forming an antistatic layer described above may be used.

According to an embodiment of the present invention, the functional layer can be laminated on the resin sheet, if necessary, in the order of an adhesive layer and the functional layer.

Examples of the resin that forms the adhesive layer include the following compounds.

Thermoplastic resins such as a (meth)acrylic resin, a chlorinated olefin-based resin, a vinyl chloride-vinyl acetate copolymer, a maleic acid-based resin, a chloride rubber-based resin, a cyclized rubber-based resin, a polyamide-based resin, a coumarone-indene-based resin, an ethylene-vinyl acetate copolymer, a polyester-based resin, a polyurethane-based resin, a styrene-based resin, a butyral resin, a rosin-based resin, and an epoxy-based resin.

The thermoplastic resin is preferably a resin composition obtained by mixing a polyamide-based resin with at least one resin selected from a butyral resin, a rosin-based resin and an epoxy-based resin. Furthermore, the thermoplastic resin may also be a resin composition obtained by mixing a polyurethane resin with at least one resin selected from a butyral resin, a rosin-based resin and an epoxy-based resin, or may also be a resin composition obtained by mixing a mixture of a polyamide-based resin and a polyurethane-based resin, with at least one resin selected from a butyral resin, a rosin-based resin and an epoxy-based resin. In all cases, there is a tendency that an adhesive layer having satisfactory adhesiveness even at a low temperature can be obtained.

Regarding the method for forming an adhesive layer, for example, a method similar to the method for forming an antireflection layer described above may be used.

<Resin Laminate>

The resin laminate of the present invention is a laminate in which a functional layer is laminated on at least one surface of a resin sheet.

EXAMPLES

Hereinafter, the present invention will be described by way of Examples. The abbreviations for the compounds used in Examples and Comparative Examples are as follows. Furthermore, in the following description, the unit "parts" represents "parts by mass".

"MMA": ACRYESTER M (methyl methacrylate manufactured by Mitsubishi Rayon Co., Ltd., trade name)

"EC": Ethylene carbonate (manufactured by Mitsubishi Chemical Corp., trade name)

"BT-01": Barium titanate (manufactured by Sakai Chemical Industry Co., Ltd., trade name)

"HPP": PERHEXYL PV (t-hexyl peroxypivalate manufactured by NOF Corp., purity: 70% by mass)

"IBXMA": Isobornyl methacrylate

"TBMA": t-Butyl methacrylate

"IBXA": Isobornyl acrylate

"BA": n-Butyl acrylate

"NPG": Neopentyl glycol dimethacrylate

"EB050S": Ethylene-methyl acrylate copolymer (manufactured by Japan Polyethylene Corp., trade name: REXPEARL EMA EB050S, content of methyl acrylate unit: 24%)

"PBPV": Perbutyl PV (t-butyl peroxypivalate manufactured by NOF Corp., purity: 70% by mass)

"POO": PEROCTA O (manufactured by NOF Corp., 1,1,3,3-tetramethylbutyl peroxy-2-ethythexanoate, purity: 90% by mass)

"PHI": PERHEXYL (manufactured by NOF Corp., t-hexylperoxyisoporopyl monocarbonate, purity: 90% by mass)

"JP-502": Ethyl acid phosphate (manufactured by Johoku Chemical Co., Ltd., trade name)

Various evaluations for the present invention were carried out by the following methods.

(1) Total Light Transmittance and Haze

Specimens having a length of 45 mm to 65 mm were cut out from a resin sheet, and the total light transmittance and the haze were measured. The total light transmittance and haze of the resin sheet were measured using a HAZE METER NDH2000 (trade name) manufactured by Nippon Denshoku Industries Co., Ltd. Furthermore, the total light transmittance and the haze of the resin sheet were measured according to the measurement method of ISO 13468-1:1996, and ISO 14782:1999.

(2) Measurement of Relative Dielectric Constant

The electrical capacitance was measured in an environment at 20° C. and a relative humidity of 50% using an impedance analyzer (4294A) (trade name) manufactured by Agilent Technologies, Inc., and the relative dielectric constant was calculated from the sample thickness and the electrode size. Furthermore, the frequency at the time of measurement was set to 1 KHz.

(3) Impact Resistance

A square-shaped resin laminate which measured 50 mm on each side was used as a specimen.

The specimen was placed on a support such that the center of the specimen and the center of a hole of the support were aligned and the surface of the cured coating layer was disposed as the top surface, and two opposite sides of the specimen were fixed to the support with Cellophane tape. Under the conditions of a temperature of 23° C. and a relative humidity of 50%, a sphere made of stainless steel was dropped on the center of the sp from various heights of 100 mm, 150 mm, 200 mm, 250 mm and 300 mm, and an evaluation for dents and cracks was carried out. The number of tests at each dropping height was 5.

A dent means cracks that are observed in a radial pattern, which are generated at the surface layer while the resin laminate itself does not crack. A crack means cracking of the resin laminate itself.

Support size: Acrylic plate having a thickness of 5 mm with a circular hole having a diameter of 20 mm Dropping ball size: Sphere made of stainless steel (sphere diameter: 15 mmϕ, mass: 17 g)

Standing tame in the atmosphere for measurement of specimen before measurement: 24 hours or longer (4) Heat Resistance A resin laminate was used as a specimen.

The deflection temperature under load (° C.) of the specimen was measured according to ISO 75-2:2004 and according to an edgewise method, and heat resistance was evaluated.

Preparation Example 1

Preparation of Curable Composition (1)

30 parts of DPHA (a mixture of dipentaerythritol pentaacrylate and dipentaerythritol hexaacrylate (manufactured by Nippon Kayaku Co., Ltd., trade name)), 10 parts of U-6HA (a urethane compound obtainable by reacting 1 mole of a triisocyanate obtainable by trimerizing hexamethylene diisocyanate, with 3 moles of 3-acryloyloxy-2-hydroxypropyl methacrylate (manufactured by Shin Nakamura Chemical Co., Ltd., trade name)), 30 parts of M305 (a mixture of pentaerythritol triacrylate and pentaerythritol tetraacrylate (manufactured by Toagosei Co., Ltd., trade name)), 30 parts of C6DA (1,6-hexanediol diacrylate (manufactured by Osaka Organic Chemical Industry, Ltd., trade name)), and 1.5 parts of IRGACURE 184 (1-hydroxycyclohexyl phenyl ketone (manufactured by BASF SE, trade name)) were mixed, and a curable composition (1) was obtained.

Preparation Example 2

Preparation of Original Syrup 1

A mixture of 0.038 parts of EB050S, 65 parts of MMA, 22 parts of IBXA, 3.5 parts of IBXA, 8.2 parts of TBMA, 1.1 parts of BA and 0.08 parts of NPG as indicated in Table 1 was supplied to a reactor equipped with a cooling tube, a thermometer and a stirrer, and the mixture was bubbled with nitrogen gas while being stirred. Subsequently, heating of the mixture was initiated. At the time point at which the liquid temperature reached 60° C., 0.034 parts of HPP was added thereto, and the liquid temperature was further increased to 100° C. This temperature was maintained for 13 minutes. Subsequently, the liquid temperature was lowered to room temperature, and Original Syrup 1 was obtained. The content of the polymer in the Original Syrup 1 was 20% by mass.

TABLE 1

| Composition of Original Syrup 1 (parts) | | | | | | |
|---|---|---|---|---|---|---|
| (c1) | (c2) | (c3) | (a) | | (b) | Copolymer (B) |
| MMA | IBXMA | TBMA | IBXA | BA | NPG | EB050S |
| 65 | 22 | 8.2 | 3.5 | 1.1 | 0.08 | 0.038 |

Reference Example 1

Two sheets of stainless steel plates (SUS304, length 300 mm, width 300 mm, and thickness 300 mm) were arranged to face each other, and the edges of the plates were sealed with a gasket made of soft polyvinyl chloride. Thus, a template for cast polymerization was produced.

100 parts of MMA, 5 parts of EC, 0.18 parts of HPPO and 0.1 parts of sodium dioctyl sulfosuccinate were mixed, and a solution was obtained. This solution was used as a polymerizable raw material.

The polymerizable raw material described above was poured into the template described above, and the space between the stainless steel plates facing each other was adjusted to 1.6 mm. Subsequently, this template was heated for 120 minutes in a water bath at 76° C., and was further heated for 60 minutes in air at 130° C., so as to polymerize the polymerizable raw material in the template. Thus, a sheet-shaped polymer was obtained. Thereafter, the template was cooled, the sheet-shaped polymer was detached from the stainless steel plates, and thus a resin sheet having a sheet thickness of 1 mm was obtained. The relative dielectric constant of the resin sheet thus obtained was 3.56. The total light transmittance nit was 92%, and the haze was 0.1%. The evaluation results are presented in Table 2.

TABLE 2

| | | | Reference Example 1 | Reference Example 2 | Reference Example 3 | Comparative Example 1 | Comparative Example 2 |
|---|---|---|---|---|---|---|---|
| Polymerizable raw material (parts) | Monomer | MMA | 100 | 100 | 100 | 100 | 100 |
| | High dielectric material (B) | EC | 5 | 10 | 15 | — | — |
| | High dielectric solid | BT-01 | — | — | — | — | 20 |
| | Initiator | HPP | 0.18 | 0.18 | 0.18 | 0.18 | 0.18 |
| | | Sodium dioctyl sulfosuccinate | 0.1 | 0.1 | 0.1 | 0.1 | 0.1 |
| Evaluation results for resin sheet | | Relative dielectric constant (—) | 3.56 | 4.21 | 5.55 | 2.85 | 3.76 |
| | | Total light transmittance (%) | 92 | 92 | 92 | 92 | 30 |
| | | Haze (%) | 0.1 | 0.1 | 0.1 | 0.1 | 80 |

Reference Examples 2 and 3

A resin sheet was produced in the same manner as in Reference Example 1, except that the amount of use of EC was changed to the amounts indicated in Table 2. The evaluation results are presented in Table 2.

Example 4

A SUS304 plate having a mirror surface was used as a template, and the curable composition (1) was applied on the mirror surface of the template. The template was covered with a PET film "NS" (manufactured by DuPont Teijin Films, Ltd., trade name) having a thickness of 12 μm, and thus a pre-curing film (1-1) was obtained.

A rubber roll having a JIS hardness of 40° C. was pressed on the PET film of the pre-curing film (1-1) so as to remove air bubbles, while any excess of the curable composition (1) was squeezed out, and thus a pre-curing film (1-2) was obtained. Subsequently, the PET film face of the pre-curing film (1-2) was disposed to face upward, and the curable composition (1) was cured by passing pre-curing film (1-2) at a position 20 cm below a fluorescent ultraviolet lamp (manufactured by Toshiba Corp., trade name: FL40BL) having a power output of 40 W at a speed of 2 m/min. Thus, a post-curing film (1-3) was obtained. Thereafter, the PET film of the post-curing film (1-3) was peeled off, and a post-curing film (1-4) was obtained.

Subsequently, the cured coating layer of the post-curing film (1-4) was disposed to face upward, and the post-curing film (1-4) was passed at a position 20 cm below a high pressure mercury lamp having a power output of 30 W/cm² at a speed of 3 m/min so as to further cure the post-curing film (1-4) by irradiating the post-curing film (1-4) with ultraviolet radiation. Thus, a laminate mold (1A) in which a cured coating layer of the curable composition (1) having a film thickness of 39 μm was laminated on the template was obtained. The laminate mold (1A) thus obtained and a SUS304 plate having no cured coating layer formed thereon were arranged to face each other such that the cured coating layer of the laminate frame (1A) was disposed on the inner side, and the peripheral edges of these two sheets of SUS304 plates were sealed with a gasket made of soft polyvinyl chloride. Thus, a laminate template (1B) was produced.

69 parts of the Original Syrup 1, 2 parts of NPG, 29 parts of MMA, and 12.5 parts of ethylene carbonate were mixed to obtain a dilute syrup, and 0.12 parts of PBPV, 0.15 parts of POO, 0.01 parts of PHI, 0.12 parts of JP-502, and 0.15 parts of sodium sulfosuccinate were added thereto to obtain a polymerizable raw material. After dissolved air in the polymerizable raw material was removed under reduced pressure, the polymerizable raw material was poured into the laminate template (1B) described above, and the polymerizable raw material was polymerized for 1 hour in a water bath at 80° C. and then for 1 hour in an air furnace at 130° C. After cooling, the SUS304 plate was detached from the laminate template (1B), and thus a resin laminate having a thickness of 1 mm, which had a cured coating layer on one surface, was obtained.

The relative dielectric constant of the resin laminate thus obtained was 4.91, the total light transmittance was 92%, the haze was 0.1%, and the heat resistance was 65° C. Furthermore, in the evaluation of impact resistance of the resin laminate, no dents were generated at a dropping height of 200 mm. The evaluation results are shown in Table 3.

TABLE 3

| | | | Example 4 | Example 5 | Comparative Example 3 |
|---|---|---|---|---|---|
| Polymerizable raw material (parts) | Syrup | Original Syrup 1 | 69 | 69 | 68 |
| | Monomer | NPG | 2 | 31 | 2 |
| | Monomer | MMA | 29 | 0 | 29 |
| | High dielectric material (B) | EC | 12.5 | 12.5 | 0 |
| | Initiator | PBPV | 0.12 | 0.12 | 0.12 |
| | | POO | 0.15 | 0.15 | 0.15 |
| | | PHI | 0.01 | 0.01 | 0.01 |
| | Others | JP-502 | 0.12 | 0.12 | 0.12 |
| | | Sodium dioctyl sulfosuccinate | 0.15 | 0.15 | 0.15 |
| Evaluation results for resin laminate | | Relative dielectric constant (—) | 4.91 | 4.99 | 3.32 |
| | | Impact resistance, dents | No occurrence | No occurrence | 150 mm |
| | | Impact resistance, cracks | 200 mm | 300 mm | 300 mm |
| | | Heat resistance (° C.) | 65 | 102 | 102 |
| | | Total light transmittance (%) | 92 | 91 | 92 |
| | | Haze (%) | 0.1 | 0.7 | 0.1 |

Example 5

A resin laminate was produced in the same manner as in Example 4, except that the composition of the polymerizable raw material was changed as indicated in Table 3. The evaluation results are presented in Table 3.

Comparative Example 1

A resin sheet was produced in the same manner as in Reference Example 1, except that 5 parts of EC was not added. The relative dielectric constant of the resin sheet thus obtained was 2.85. Furthermore, the total light transmittance of the resin sheet was 92%, and the haze value was 0.1%. The evaluation results are presented in Table 2. Since high dielectric material (B) was not added, the resin sheet had a low relative dielectric constant.

Comparative Example 2

A resin sheet was produced in the same manner as in Reference Example 1, except that 20 parts of barium titanate was used instead of 5 parts of EC. The relative dielectric constant of the resin sheet thus obtained was 3.76. Furthermore, the total light transmittance of the resin sheet was 30%, and the haze was 80%. The evaluation results are presented in Table 2. Since a high dielectric material (B) was not used, the resin sheet exhibited insufficient transparency.

Comparative Example 3

A resin laminate was produced in the same manner as in Example 4, except that the composition of the polymerizable raw material was changed as indicated in Table 3. The evaluation results are presented in Table 3. Since a high dielectric material (B) was not added, the resin laminate exhibited a low relative dielectric constant. Also, the resin laminate also exhibited low impact resistance.

INDUSTRIAL APPLICABILITY

According to the present invention, there are obtained a resin laminate which has excellent transparency and a high relative dielectric constant and is therefore suitable when a person uses the resin laminate by direct touching, and a resin laminate which has excellent transparency and impact resistance and a high relative dielectric constant and is therefore suitable when a person uses the resin laminate by direct touching. Therefore, the present invention is industrially very important because "a resin composition, a resin sheet and a resin laminate" can be suitably utilized as optical materials.

The invention claimed is:

1. A resin composition comprising 100 parts by mass of a polymer (A) and 0.5 parts to 60 parts by mass of a high dielectric material (B), the high dielectric material (B) having a relative dielectric constant at 20° C. of 10 or more, a melting point of 45° C. or lower, and a boiling point of 150° C. or higher,
   wherein the polymer (A) is at least one polymer selected from polymethyl methacrylate, and an acrylic copolymer (A-1) containing 40% by mass or more and less than 100% by mass of a methyl methacrylate unit; and more than 0% by mass and 60% by mass or less of another vinyl monomer unit, and
   the other vinyl monomer unit is a monomer unit derived from a monomer having two or more ethylenically unsaturated bonds in the molecule.

2. The resin composition according to claim 1, comprising the high dielectric material (B) in an amount of 7.5 parts to 15 parts by mass.

3. The resin composition according to claim 1, comprising the high dielectric material (B) in an amount of 10 parts to 13 parts by mass.

4. The resin composition according to claim 1, wherein the relative dielectric constant at 20° C. of the high dielectric material (B) is 50 or more.

5. The resin composition according to claim 1, wherein the high dielectric material (B) is at least one compound selected from the group consisting of ethylene carbonate and propylene carbonate.

6. The resin composition according claim 1, wherein the polymer (A) is at least one polymer selected from an acrylic polymer, an aromatic vinyl monomer unit-containing polymer, an olefin resin, and a polycarbonate resin.

7. The resin composition according to claim 1, wherein the other vinyl monomer is a monomer unit derived from neopentyl glycol dimethacrylate.

8. A resin sheet comprising the resin composition according to claim 1.

9. A resin laminate having a functional layer laminated on one surface or on both surfaces of the resin sheet according to claim 8.

10. The resin laminate according to claim 9, wherein the functional layer is a layer having at least one function selected from an antireflection function, an antiglare function, a hard coat function, an antistatic function, and an antifouling function.

11. The resin sheet according to claim 8, having a relative dielectric constant at 20° C. of 4.0 or more, a transmittance of 80% or higher, and a haze value of 2% or less.

12. The resin sheet according to claim 11, having a transmittance of 88% or higher and a haze value of 1% or less.

13. The resin sheet according to claim 11, wherein a deflection temperature under load according to ISO 75-2: 2004, which represents the temperature at which the temperature of a sample is gradually raised in a state of being under a load determined by ISO 75-2: 2004, and the magnitude of the deflection reaches a certain value, is 80° C. or higher.

* * * * *